US011747768B2

(12) United States Patent
Franzi et al.

(10) Patent No.: US 11,747,768 B2
(45) Date of Patent: Sep. 5, 2023

(54) SMARTWATCH COMPRISING A VISUAL ANIMATION SCREEN

(71) Applicant: Tissot SA, Le Locle (CH)

(72) Inventors: Edoardo Franzi, Cheseaux-Noreaz (CH); Jean-Marc Koller, Yverdon-les-Bains (CH)

(73) Assignee: Tissot SA, Le Locle (CH)

( * ) Notice: Subject to any disclaimer, the term of this patent is extended or adjusted under 35 U.S.C. 154(b) by 245 days.

(21) Appl. No.: 17/034,010

(22) Filed: Sep. 28, 2020

(65) Prior Publication Data

US 2021/0141345 A1  May 13, 2021

(30) Foreign Application Priority Data

Nov. 8, 2019  (EP) ..................... 19208048

(51) Int. Cl.
*G06F 3/14* (2006.01)
*G06F 1/16* (2006.01)
(Continued)

(52) U.S. Cl.
CPC ............. *G04G 9/007* (2013.01); *G04G 21/02* (2013.01); *G04G 21/04* (2013.01); *G06F 1/163* (2013.01);
(Continued)

(58) Field of Classification Search
CPC .......... G04G 9/00; G04G 9/007; G04G 21/02; G04G 21/04; G04G 21/08; G04G 99/006;
(Continued)

(56) References Cited

U.S. PATENT DOCUMENTS 10,175,653 B1   1/2019 Bloom et al.
2005/0013197 A1  1/2005 Chung et al.
(Continued)

FOREIGN PATENT DOCUMENTS

CN    202196273 U   4/2012
CN    103760758 A   4/2014
(Continued)

OTHER PUBLICATIONS

Aaron Quigley and Jens Grubert, "Perceptual and Social Challenges in Body Proximate Display Ecosystems", 2015, Association for Computing Machinery, In Proceedings of the 17th International Conference on Human-Computer Interaction with Mobile Devices and Services Adjunct (MobileHCI '15), pp. 1168-1174 (Year: 2015).*

(Continued)

*Primary Examiner* — Jennifer N Welch
*Assistant Examiner* — Kuang F Chen
(74) *Attorney, Agent, or Firm* — Oblon, McClelland, Maier & Neustadt, L.L.P.

(57) ABSTRACT

A smartwatch including a first screen cooperating with a first display management device of said smartwatch contributing to broadcasting information pertaining to functions provided by the smartwatch and a second screen that is separate from the first screen cooperating with a second display management device of the smartwatch contributing to broadcasting information concerning all or part of a visual message pertaining to a visual and/or audio animation occurring within an environment wherein the smartwatch is located, the information being transmitted from a display control server controlling the second display management device of the smartwatch.

10 Claims, 1 Drawing Sheet

(51) Int. Cl.
- *G04G 9/00* (2006.01)
- *G06F 9/451* (2018.01)
- *G04G 21/02* (2010.01)
- *G04G 21/04* (2013.01)
- *H04B 1/3827* (2015.01)
- *H04L 12/18* (2006.01)
- *G04G 21/08* (2010.01)
- *G06Q 50/00* (2012.01)

(52) U.S. Cl.
CPC ............... *G06F 3/14* (2013.01); *G06F 9/451* (2018.02); *H04B 1/385* (2013.01); *H04L 12/18* (2013.01); *G04G 21/08* (2013.01); *G06Q 50/01* (2013.01)

(58) Field of Classification Search
CPC .... G04G 9/0064; G04G 9/0005; G04G 17/06; G04G 21/00; G06F 3/14; G06F 1/163; G06F 9/451; H04M 1/02; H04B 1/385; H04L 12/18; G06Q 50/01; A44C 5/0015; G06T 13/20
See application file for complete search history.

(56) References Cited

U.S. PATENT DOCUMENTS

| | | | |
|---|---|---|---|
| 2009/0230895 A1 | 9/2009 | De Prycker et al. | |
| 2015/0160621 A1* | 6/2015 | Yilmaz | G06F 1/1643 368/10 |
| 2015/0185874 A1* | 7/2015 | Raffa | G06F 3/0487 345/158 |
| 2015/0186092 A1* | 7/2015 | Francis | G06F 21/35 345/520 |
| 2015/0238141 A1* | 8/2015 | Lai | A61B 5/681 600/300 |
| 2016/0085286 A1* | 3/2016 | Zhou | G06F 3/005 345/156 |
| 2016/0090293 A1* | 3/2016 | Oliaei | B81B 7/00 381/111 |
| 2016/0147713 A1* | 5/2016 | Ni | G06T 3/40 345/660 |
| 2016/0253142 A1* | 9/2016 | Choi | G06F 3/1454 345/1.3 |
| 2017/0208160 A1* | 7/2017 | Kim | H02J 7/02 |
| 2017/0213498 A1 | 7/2017 | Basargin et al. | |
| 2017/0270699 A1 | 9/2017 | Koide | |
| 2018/0303396 A1* | 10/2018 | Wild | G16H 50/70 |

FOREIGN PATENT DOCUMENTS

| | | |
|---|---|---|
| CN | 203986445 U | 12/2014 |
| CN | 106131322 A | 11/2016 |
| CN | 105320454 A | 2/2018 |
| CN | 109151515 A | 1/2019 |
| CN | 109298649 A | 2/2019 |
| CN | 109782563 A | 5/2019 |
| JP | 2017-028680 A | 2/2017 |
| WO | WO 2016/012836 A1 | 1/2016 |

OTHER PUBLICATIONS

Combined Chinese Office Action and Search Report dated Aug. 26, 2021 in Chinese Patent Application No. 202011236793.9 (with English translation of Category), 7 pages.

European Search Report dated Mar. 31, 2020 in European Application 19208048.9 filed on Nov. 8, 2019 (with English Translation of Categories), 3 pages.

Combined Cinese Office Action and Search Report dated Feb. 8, 2022 in Chinese Patent Application No. 202011236793.9 (with English translation), 11 pages.

Japanese Notice of the Reason of Refusal dated Dec. 6, 2022, in Japanese Patent Application No. 2020-170303, 39 pages (with English Translation).

\* cited by examiner

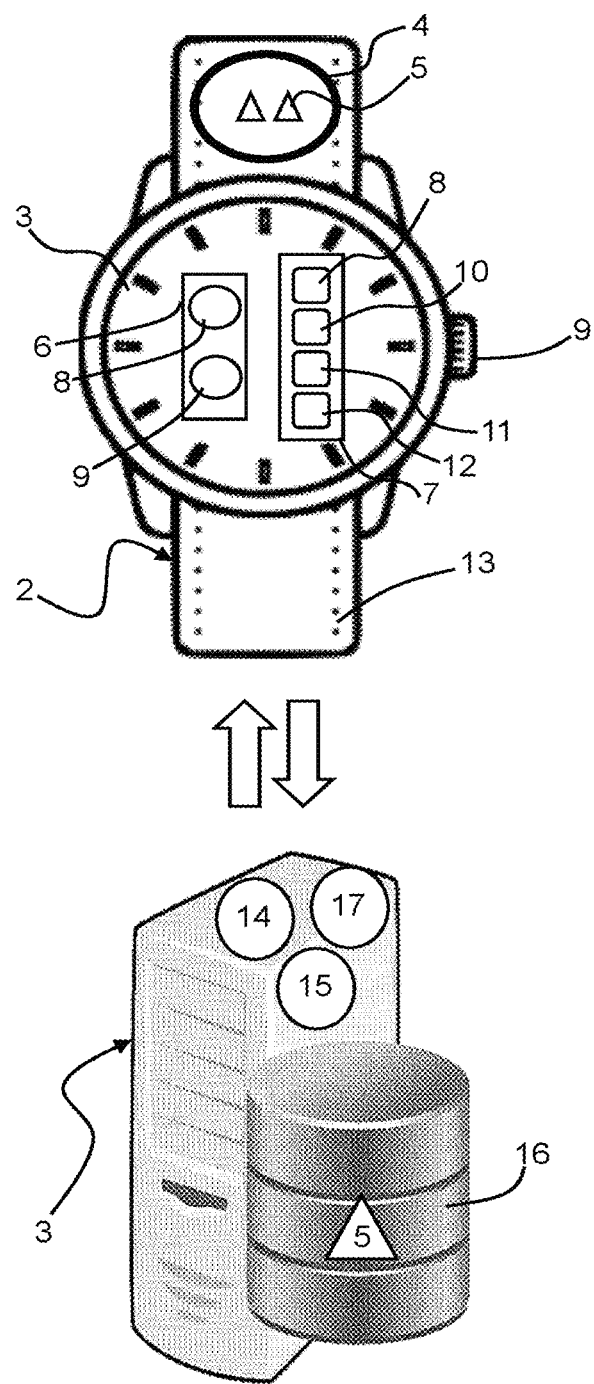

SMARTWATCH COMPRISING A VISUAL ANIMATION SCREEN

CROSS-REFERENCE TO RELATED APPLICATION

This application claims priority to European Patent Application No. 19208048.9 filed on Nov. 8, 2019, the entire disclosure of which is hereby incorporated herein by reference.

TECHNICAL FIELD

The invention relates to a smartwatch comprising a first screen and a second screen, referred to as a visual animation screen, which is separate from the first screen and the purpose whereof is to broadcast visual messages pertaining to visual and/or audio animations occurring within an environment/place in which said watch is located.

The invention further relates to a system for managing a plurality of smartwatches of this type comprising such visual animation screens jointly forming a display interface.

TECHNOLOGICAL BACKGROUND

During visual and/or audio animations such as shows of the concert type or even sporting events, electronic devices such as smartphones, video cameras or photographic devices are commonly brandished by people in the audience, in particular in order to capture moments in these shows.

However, such a use of these devices during these shows has the major drawback of systematically creating visual pollution and thus disrupting the correct performance thereof.

Under these conditions, it is understood that there is a real need for a solution that overcomes these drawbacks of the prior art.

SUMMARY OF THE INVENTION

One of the purposes of the present invention is thus to propose a method for taking advantage of the screens of electronic devices such as smartwatches to contribute to the visual show provided by such performances.

For this purpose, the invention relates to a smartwatch comprising a first screen cooperating with a first display management device of said watch contributing to broadcasting information pertaining to functions provided by said watch and a second screen that is separate from the first screen cooperating with a second display management device of the watch contributing to broadcasting information concerning all or part of a visual message pertaining to a visual and/or audio animation occurring within an environment in which said watch is located, said information being transmitted from a display control server controlling the second display management device of the watch.

In other embodiments:
the second device comprises a communication interface dedicated to exchanging management data for the display of information pertaining to the visual message with the control server;
the second device comprises a module for acquiring the position of the smartwatch, said module being suitable for detecting other smartwatches provided with the same second screens which are arranged in the immediate environment thereof;
the position acquisition module implements Bluetooth™ low energy type technology and in particular a so-called direction finding functionality of this technology;
the position acquisition module implements technology of the Ultra Wide Band type;
the second device comprises a module for measuring the orientation of the second screen;
the module for measuring the orientation of the second screen comprises one or more inertial sensors of the accelerometer, miniature multi-axis rate sensor or gyroscope type such as multi-axis sensors manufactured using MEMS technology, capable of detecting angular speeds and linear accelerations along a plurality of axes associating accelerometers and/or gyroscopes;
the second device comprises a processing unit connected to the communication interface, and to the modules for measuring the orientation of the second screen and for acquiring the position of the smartwatch;
the first device comprises a processing unit and an input interface;
the second screen is included in the bracelet of the watch.

The invention further relates to a system for managing a plurality of smartwatches, the system being intended to produce a display of a visual message on a display interface formed by said second screens of this plurality of smartwatches, each watch of this system comprising first and second screens, the first screen cooperating with a first display management device of the watch to broadcast information pertaining to functions provided by said watch and the second screen, which is separate from the first screen, cooperating with a second display management device of the watch to broadcast information pertaining to all or part of this visual message pertaining to a visual and/or audio animation occurring within an environment in which said watch is located, said information being transmitted from a display control server of this system controlling the second display management device of the watch.

BRIEF DESCRIPTION OF THE FIGURES

The invention will be described in more detail hereafter using an accompanying drawing, given by way of example that is in no way limiting, wherein:

FIG. 1 shows a system for managing a plurality of smartwatches intended to produce a display of a visual message on a display interface formed by said second screens of this plurality of smartwatches, according to one embodiment of the present invention.

DETAILED DESCRIPTION OF THE INVENTION

FIG. 1 shows a smartwatch 2 comprising a first screen 3 comprising a hybrid display dial provided with a first analogue display component and with a second digital and/or alphanumerical display component. Such a first screen 3 is also referred to as a "function screen" since it is specifically designed to broadcast information pertaining to functions carried out by this watch and addressed to or to be used by the user of this watch 2, in this case the wearer thereof, following an interaction between this user and an input interface 9 of this watch 2. These functions concern, for example, the use or the viewing of time or alarm information, or even information on global positioning or position determination (compass), etc.

This smartwatch 2 comprises a second screen 4 referred to as a "visual animation screen", which is separate from the function screen 3. This visual animation screen 4 is solely intended to contribute to the broadcasting of all or part of a visual message 5 in a synchronised or coordinated manner with other second screens of smartwatches arranged in the same place or environment. More specifically, these second screens 4 can each broadcast the same visual message 5 or a complementary portion of this visual message 5 such that all of these second screens jointly form a display interface comprising the visual message resulting from the assembly of all of these portions. These visual messages 5 are different from functions carried out by the watch 2 in particular since the broadcasting thereof does not result from a prior configuration of a computer application of the watch 2 by the user or even from an interaction between the input interface 9 of this watch 2 and the user. Moreover, these visual messages 5 are not solely intended for the wearer of the watch as can be the case for a function of the watch such as an alarm. In the context of this embodiment, each visual message 5 pertains to a visual and/or audio animation (for example a sporting event, a cultural event, a show, a concert, etc.) occurring within an environment/place/location in which said watch 2 is located. As mentioned hereinabove, this visual message 5 is intended for a display interface formed by a plurality of second screens of smartwatches 2 arranged in an environment/place/location close to the smartwatch 2. Moreover, this visual message 5 aims, for example, to provide a visual contribution to the visual and/or audio animations. It is thus understood that the contents of this visual message 5 directly relate to the visual and/or audio animation occurring within the environment in which the smartwatch 2 is located and thus in which the user of the watch 2 is located. Such a content can be synchronised or coordinated with this visual and/or audio animation. For the purposes of illustration, such a visual message 5 comprises an animated or static graphical representation. In a non-limiting and non-exhaustive manner, this message 5 comprises an image containing objects or a light pattern or even a symbolic portrayal of an emotion of the "emoticon" type, a graphics interchange format (GIF), a word/term or a group of words/terms or even a video.

This second screen 4 is preferably arranged in a flexible or rigid bracelet 13 of said watch 2. Such a second screen 4 is of the active matrix type and comprises light-transmitting electrodes. Moreover, it is deformable and stretchable.

Such a watch 2 comprises a first display management device 6 which is connected to the first screen 3. This first device 6 is intended to manage the display of this first screen 3 in particular as a function of the interactions between the watch 2 and the user. This first device 6 essentially comprises:
- a processing unit 8 including hardware and software resources, in particular at least one processor cooperating with memory elements, and
- an input interface 9 such as a push button, a crown, a keypad or even a touch-sensitive interface included, for example, in the interface for broadcasting visual information.

It should be noted that the first management device 6 is preferably arranged in a case of the watch 2.

The watch 2 further comprises a second display management device 7 which is connected to the second screen 4. This second 7 includes:
- the processing unit 8;
- a communication interface 10 dedicated to exchanging management data for the display of information pertaining to the visual message 5 with a control server 3 managing/controlling the second display management device 7 of the watch 2, the server 3 preferably being included in a remote technical platform;
- a position acquisition module 11 of this smartwatch 2, which is capable of detecting other smartwatches, preferably of a similar type and provided with the same second screens, which are arranged in the immediate environment thereof, i.e. the other watches close by or in the vicinity thereof. Moreover, this module 11 of the smartwatch 2 is capable of determining the distance separating it from the other watches and of positioning each of the other watches close by in relation to/relative to its own position;
- a module 12 for measuring the orientation of the second screen 4, which module 12 comprises one or more inertial sensors of the accelerometer, miniature multi-axis rate sensor or gyroscope type such as multi-axis sensors manufactured using MEMS technology, capable of detecting angular speeds and linear accelerations along a plurality of axes associating accelerometers and/or gyroscopes.

It should be noted that the second management device 7 is preferably arranged in the case of the watch 2 and that it is connected to the second screen 4 which is preferably included in the bracelet 13.

In this second device 7, it should be noted that the position acquisition module 11 is capable of determining the distance separating the watch 2 comprising same, from the other watches and of positioning each of the other watches close to said watch 2 in relation to/relative to the position of this said watch 2. To achieve this, such a module 11 can implement:
- Bluetooth™ low energy (BLE) type technology and in particular a so-called direction finding functionality of this technology, and/or
- technology of the Ultra Wide Band (UWB) type.

As mentioned hereinabove, such a second screen 5 of this smartwatch 2 is capable of forming, with other second screens of other smartwatches arranged in the environment of this smartwatch 2, a display interface, all of the smartwatches being worn by users located in the same place. In this context, the watches 2 are thus located near one another to form this display interface. In other words, such a display interface is thus formed by all of the second screens 4 of this watch 2 and of the other smartwatches of users all located in the same venue/location/place. It is understood that each of the users wearing a smartwatch 2 can be grouped together in the same concert hall or in the same arena or even in the same stadium, where a sporting or cultural event is to take place for example.

In this context, the invention relates to a system 1 for managing a plurality of these smartwatches 2, said system 1 being intended to produce a display of at least one visual message 5 on a display interface formed by the second screens 4 of this plurality of smartwatches 2. In this system 1, each smartwatch 2 comprises the first screen 3 cooperating with the first display management device 6 of the watch 2 for broadcasting information pertaining to functions carried out by said watch 2 and the second screen 4, which is separate from the first screen 3, cooperating with the second display management device 7 of the watch 2 for broadcasting information pertaining to all or part of this visual message 5.

This system 1 further comprises the display control server 3 which contributes to controlling or managing the second display management device 7 of the watch 2. Such a server 3 comprises:
- a processing unit 14;
- a communication interface 15 for exchanging management data for the display of information pertaining to the visual message 5 with each smartwatch 2 via a communication network;
- a database 16 comprising visual messages 5, and
- an input interface 17 connected to the processing unit 14 and which allows a visual message 5 to be input or even a message 5 archived in the database to be selected.

This server 3 is capable of exchanging management data for the display of information pertaining to the visual message 5, such data comprising, in a non-limiting and non-exhaustive manner, measurement data that will be described hereafter, data pertaining to the visual message 5 and/or portions of this visual message 5.

In this system 1, when the smartwatches 2 detect the server 3, they establish a connection therewith, which thus requires measurement data relating to each of second screens 4 of these watches 2 in order to manage the broadcasting of the visual message 5 by these second screens 4. This data comprises measurements of at least one broadcasting feature of each second screen 4. The broadcasting feature corresponds, in a non-limiting and non-exhaustive manner, to:
- a feature concerning the location of each watch 2 relative to the other smartwatches 2, the second screens whereof form the display interface, and/or
- a feature concerning the orientation of the second screen 4 of said smartwatch 2.

Such features are intended to identify/assess the broadcasting properties of each second screen 4 in order to optimally configure the broadcasting parameters of the display interface constituted by these second screens 4. In other words, it is understood, for example, that a second screen 4 can be enabled/disabled, i.e. that it is capable of broadcasting or of not broadcasting a portion of the visual message 5 as a function of the position and/or the orientation thereof.

In this context, the second display management device 7 of each smartwatch 2 is configured such that it determines said at least one broadcasting feature of each second screen 4 by taking measurements of this feature using the position acquisition module 11 and/or orientation measurement module 12 of the second screen 4.

Said at least one feature thus measured contributes to constituting the measurement data which is then transmitted by each of these second management devices 7 to the server 3 via the communication interfaces 10, 15 of these watches 2 and of the server 3.

In this server 3, the processing unit 14, which is connected to the input interface 17 and to the database 16, thus contributes to producing and archiving the visual message 5 which is preferably designed in line with the theme of the visual and/or audio animation, where it will be broadcast.

Furthermore, this processing unit 14 is configured such that it designs a mapping of the arrangement of all of the second screens 4 forming the display interface. For this purpose, this processing unit 14 carries out operations involving selecting or sorting the second screens 4 that are the best suited to broadcasting the visual message 5 produced, as regards the orientation thereof, the distance separating them from other second screens 4, and the arrangement thereof relative to the other second screens 4. Such operations are carried out based on measurement data and also as a function of the nature or type of the visual message 5 to be broadcast. On this basis, the processing unit 14 thus builds a virtual representation of the display interface on which the visual message 5 will be displayed, said representation comprising the second screens 4 that are the best suited for broadcasting the visual message 5.

Under these conditions, the processing unit 14 of the server 3 identifies, from the mapping of the arrangement of the second screens 4 constituting the display interface, i.e. the second screens 4 capable of broadcasting said visual message 5. Thereafter, this processing unit 14 carries out operations for separating/dividing the visual message into as many portions as there are second screens 4 to ensure the broadcasting of the visual message 5 on the visual interface. These portions are then transmitted to the corresponding smartwatches 2 via the communication interfaces of the server 3 and of the smartwatches 2. Alternatively, the processing unit 14 can directly send the same visual message 5 to all of these second screens 4.

Thus, in the invention, the management of the display of the second screen 4 of each smartwatch 2 is assured in a separate and autonomous manner compared to that of the first screen 3, in particular based on the data exchange that took place between the second management device 7 and the server 3. In addition, it should be noted that the management of the display of the visual message 5 requires the measurement data to have been firstly acquired by the second device 7.

The invention claimed is:

1. A smartwatch, comprising:
a first screen;
a second screen that is located away from and separate from the first screen; and
processing circuitry arranged in a case of the smartwatch, the processing circuitry including:
a first controller configured to cause the first screen to display first information pertaining to functions provided by said smartwatch,
and
a second controller configured to independently control the second screen by sending second information to the second screen to cause the second screen to display the second information, including a visual message pertaining to at least one of a visual and audio animation occurring within an environment in which said smartwatch is located,
said second information, including the visual message, being transmitted from a display control server to the second controller, but not to the first controller.

2. The smartwatch according to claim 1, further comprising a communication interface is connected to the second controller, wherein the communication interface is configured to exchange, with the display control server, management data for the display of the second information including the visual message.

3. The smartwatch according to claim 1, further comprising a position acquisition circuit associated with the second controller, wherein the position acquisition circuit is configured to acquire a position of the smartwatch, and configured to detect other smartwatches provided with identical second screens that are arranged in an immediate environment of the smartwatch.

4. The smartwatch according to claim 3, wherein the position acquisition circuit is further configured to implement at least one of Bluetooth™ low energy type technology and Technology of an Ultra Wide Band type.

5. The smartwatch according to claim 1, wherein the second controller is further configured to measure an orientation of the second screen.

6. The smartwatch according to claim 5, wherein the second controller is associated with one or more inertial sensors of an accelerometer, or a miniature multi-axis rate sensor, each configured to detect angular speeds and linear accelerations along a plurality of axes.

7. The smartwatch according to claim 3, wherein the second controller is connected to a communication interface and to the position acquisition circuit.

8. The smartwatch according to claim 1, further comprising an input interface communicatively coupled to the first controller.

9. The smartwatch according to claim 1, wherein the second screen is arranged in a band of the smartwatch.

10. A system for managing a plurality of smartwatches, the system being configured to produce a display of the visual message on a display interface collectively formed by second screens of said plurality of smartwatches, each smartwatch of said system comprising:

a first screen;

a second screen that is located away from and separate from the first screen; and processing circuitry arranged in a case of the smartwatch, the processing circuitry including:

a first controller configured to cause the first screen to display first information pertaining to functions provided by said smartwatch, and a second controller configured to independently control the second screen by sending second information to the second screen to cause the second screen to display the second information, including a visual message pertaining to at least one of a visual and audio animation occurring within an environment in which said smartwatch is located, said second information, including the visual message, being transmitted from a display control server to the second controller, but not to the first controller.

\* \* \* \* \*